US009742868B2

(12) United States Patent
Zuo et al.

(10) Patent No.: US 9,742,868 B2
(45) Date of Patent: Aug. 22, 2017

(54) METHOD, DEVICE AND SYSTEM FOR PROCESSING INSTANT MESSAGING INFORMATION AND SETTING TERMINAL PRIORITY

(71) Applicant: ZTE CORPORATION, Shenzhen, Guangdong Province (CN)

(72) Inventors: Xiaofei Zuo, Shenzhen (CN); Quan Luo, Shenzhen (CN); Ling Li, Shenzhen (CN); Nairong Li, Shenzhen (CN); Changshan Liu, Shenzhen (CN); Chuan Shi, Shenzhen (CN); Wenfen Yan, Shenzhen (CN); Ruiping Liu, Shenzhen (CN); Haiyan Ning, Shenzhen (CN)

(73) Assignee: ZTE CORPORATION, Shenzhen, Guangdong Province (CN)

( * ) Notice: Subject to any disclaimer, the term of this patent is extended or adjusted under 35 U.S.C. 154(b) by 224 days.

(21) Appl. No.: 14/427,670

(22) PCT Filed: Jul. 10, 2013

(86) PCT No.: PCT/CN2013/079159
§ 371 (c)(1),
(2) Date: Mar. 12, 2015

(87) PCT Pub. No.: WO2013/178134
PCT Pub. Date: Dec. 5, 2013

(65) Prior Publication Data
US 2015/0244834 A1  Aug. 27, 2015

(30) Foreign Application Priority Data
Sep. 13, 2012  (CN) .......................... 2012 1 0337642

(51) Int. Cl.
*G06F 15/16* (2006.01)
*H04L 29/08* (2006.01)
(Continued)

(52) U.S. Cl.
CPC .......... *H04L 67/322* (2013.01); *G06F 1/3287* (2013.01); *H04L 51/04* (2013.01);
(Continued)

(58) Field of Classification Search
CPC ............... H04L 67/322; H04L 67/2852; H04L 67/1097; H04L 51/04; H04L 51/26; G06F 1/3287
See application file for complete search history.

(56) References Cited

U.S. PATENT DOCUMENTS

2002/0174213 A1* 11/2002 Ibaraki .................... G10L 15/28
709/223
2007/0003029 A1* 1/2007 Vesterinen ........... G06Q 10/107
379/88.14
(Continued)

FOREIGN PATENT DOCUMENTS

CN  102404397 A  4/2012
CN  102868819 A  1/2013
(Continued)

*Primary Examiner* — Padma Mundur
(74) *Attorney, Agent, or Firm* — Ling Wu; Stephen Yang; Ling and Yang Intellectual Property (57) ABSTRACT

A method, device and system for processing instant messaging information and setting terminal priority, wherein the method for processing instant messaging information includes: each powered-on terminal under the same account of a user respectively receiving priority information corresponding to each terminal and sent by a cloud server; and when a powered-on terminal receives instant messaging information, the terminal judging whether its own priority is the highest or not according to the received priority information, and if yes, processing the received instant messaging information; otherwise, do not performing any response
(Continued)

to the received instant messaging information. With the method, device and system in accordance with the embodiment of the present document, the privacy of the user's personal information is good and the security is relatively high, and the problem of processing confusion can be avoided.

13 Claims, 3 Drawing Sheets

(51) Int. Cl.
   *H04L 12/58*     (2006.01)
   *G06F 1/32*      (2006.01)

(52) U.S. Cl.
   CPC ...... *H04L 67/1097* (2013.01); *H04L 67/2852* (2013.01); *H04L 51/26* (2013.01)

(56) References Cited

U.S. PATENT DOCUMENTS

| | | | |
|---|---|---|---|
| 2007/0015463 A1* | 1/2007 | Abel | H04B 5/0031 |
| | | | 455/41.1 |
| 2007/0130155 A1* | 6/2007 | Alperin | H04L 41/0806 |
| 2008/0098076 A1 | 4/2008 | Lee et al. | |

FOREIGN PATENT DOCUMENTS

| | | | |
|---|---|---|---|
| CN | 102882944 | A | 1/2013 |
| CN | 102883285 | A | 1/2013 |
| EP | 1879352 | A2 | 1/2008 |
| WO | 2004049679 | A1 | 6/2004 |

* cited by examiner

METHOD, DEVICE AND SYSTEM FOR PROCESSING INSTANT MESSAGING INFORMATION AND SETTING TERMINAL PRIORITY

TECHNICAL FIELD

The present document relates to the field of mobile communication technology, and more particularly, to a method, device and system for processing instant messaging information and setting terminal priority.

BACKGROUND

With the pursuit of quality of life, more and more mobile terminals enter into people's lives, and accounts of mobile terminals play an increasingly important role in intelligent terminals. A user often manages the user's personal information through the accounts of mobile terminals, and sometimes the accounts of these mobile terminals are payment accounts in online application stores, for example, contacts, mails, Internet Protocol (IP) messages, Voice Over IP (VOIP) and other functions are closely related to the accounts. From this, it can be seen that the account is the key for using a mobile terminal, and this key can simultaneously open multiple doors, for example, the account of the same user can be registered in a plurality of mobile terminals, which may be a mobile phone, a tablet computer or a plurality of same mobile terminals, and the like.

For the plurality of terminals under the same account of a user, if the account is logged in through a plurality of terminals at the same time, then if all of the plurality of terminals receive one piece of instant messaging information, such as a VOIP video call, in this case, each of the terminals will display the user's call information, resulting in that the privacy of the user's personal information is relatively poor and the security is low, and multiple terminals might simultaneously process the received video call, resulting in the problem of processing confusion and bringing the user a big inconvenience.

SUMMARY

The embodiment of the present document provides a method, device and system for processing instant messaging information and setting terminal priority, to solve the problem of poor private of user's personal information and low security, as well as processing confusion resulting from that a plurality of terminals under the same account simultaneously processes instant messaging information.

The embodiment of the present document provides a method for processing instant messaging information, comprising:

each powered-on terminal under the same account of a user respectively receiving a priority information corresponding to each terminal and sent from a cloud server, wherein, the priority information corresponding to the each terminal is preset by the user; and when a powered-on terminal receives an instant messaging information, the terminal judging whether its own priority is the highest or not according to the received priority information, and if yes, processing the received instant messaging information; if no, not performing any response to the received instant messaging information.

Alternatively, the method further comprises:

after being activated, each powered-on terminal under the same account prompting a message to the user for setting the priority;

the terminal which receives a setting confirmation command from the user in the powered-on terminals under the same account obtaining saved priority information of all terminals under the same account from the cloud server and displaying to the user; and the terminal which receives the setting confirmation command from the user uploading the priority information of all the terminals respectively set by the user under the same account to the cloud server to update.

Alternatively, the method further comprises:

when the terminal needs to power off, the terminal judging whether its own priority is the highest or not according to the received priority information, and if yes, uploading its own power-off state information to the cloud server; and the terminal receiving a prompt message sent by the cloud server for resetting priorities of all the terminals after the cloud server receives the power-off state information, and displaying the message to the user.

Alternatively, the step of activating each powered-on terminal under the same account comprises:

each powered-on terminal using its own near field communication (NFC) non-contact sensing device to induce with NFC non-contact sensing devices of other terminals to be activated.

The embodiment of the present document further provides a method for setting terminal priority, comprising:

a cloud server receiving priority information of all terminals uploaded by a powered-on terminal which receives a setting confirmation command from a user;

the cloud server updating locally stored priority information of all the terminals according to the received priority information of all the terminals, and sending the updated priority information of all the terminals to all the powered-on terminals.

Alternatively, the method further comprises:

when receiving a power-off state information uploaded by the terminal with the highest priority, the cloud server sending a prompt message to other powered-on terminals for resetting the priorities of all the terminals.

The embodiment of the present document further provides a terminal, comprising:

a receiving module, which is configured to: receive priority information sent by a cloud server, wherein the priority information is preset by the user;

a judging module, which is configured to: when the terminal is powered on and receives an instant messaging information, judge whether its own priority is the highest or not according to the priority information received by the receiving module; and a processing module, which is configured to: when the judging module determines that its own priority is the highest, process the received instant messaging information; when the judging module determines that its own priority is not the highest, do not perform any response to the received instant messaging information.

Alternatively, the terminal further comprises:

a priority setting module, configured to: after the terminal is powered on and activated, prompt a message to the user for setting the priority; after the terminal receives a setting confirmation command sent by the user, obtain the saved priority information of all the terminals under the same account from the cloud server and display it to the user; and after the terminal receives the setting confirmation command from the user, upload the priority information respectively set by the user for all the terminals under the same account to the cloud server to update.

Alternatively, the judging module is further configured to: when the terminal needs to power off, judge whether its own priority is the highest or not according to the priority information received by the receiving module;

the priority setting module is further configured to: when the judging module determines that the priority of the terminal is the highest, upload the power-off state information of the terminal to the cloud server; and receive a prompt message sent by the cloud server for resetting priorities of all terminals after receiving the power-off state information and display the message to the user.

The embodiment of the present document further provides a cloud server, comprising:

a receiving module, which is configured to: receive priority information of all terminals uploaded by a powered-on terminal which receives a setting confirmation command from a user;

a updating module, which is configured to: update locally stored priority information of all the terminals according to the priority information of all the terminals received by the receiving module; and a sending module, which is configured to: send the priority information of all the terminals updated by the updating module to all the powered-on terminals.

Alternatively, the sending module is further configured to: when receiving a power-off state information uploaded by the terminal with the highest priority, send a prompt message to other powered-on terminals for resetting priorities of all the terminals.

The embodiment of the present document further provides a system for processing instant messaging information, comprising: a plurality of terminals under the same account and a cloud server;

each terminal is configured to: receive priority information corresponding to each terminal and sent from the cloud server when each terminal is in the powered-on state; and when receiving instant messaging information, judge whether its own priority is the highest or not according to the received priority information, when determining that its own priority is the highest, process the received instant messaging information; when determining that its own priority is not the highest, not perform any response to the received instant messaging information;

the cloud server is configured to: receive priority information of all terminals uploaded by a powered-on terminal which receives a setting confirmation command sent by a user; update locally stored priority information of all the terminals according to the received priority information of all the terminals, and send the updated priority information of all the terminals to all the powered-on terminals.

With the method, device and system of the embodiment of the present document, the privacy of the user's personal information can be relatively good and the security can be relatively high, and the problem of processing confusion can be avoided.

PREFERRED EMBODIMENTS OF THE DOCUMENT

Hereinafter, in conjunction with the accompanying drawings, the specific embodiments of the method, device and system for processing instant messaging information and setting terminal priority in accordance with the embodiment of the present document will be described. In the case of no conflict, the embodiments and features in the embodiments of the present application may be combined with each other.

Figure 1:
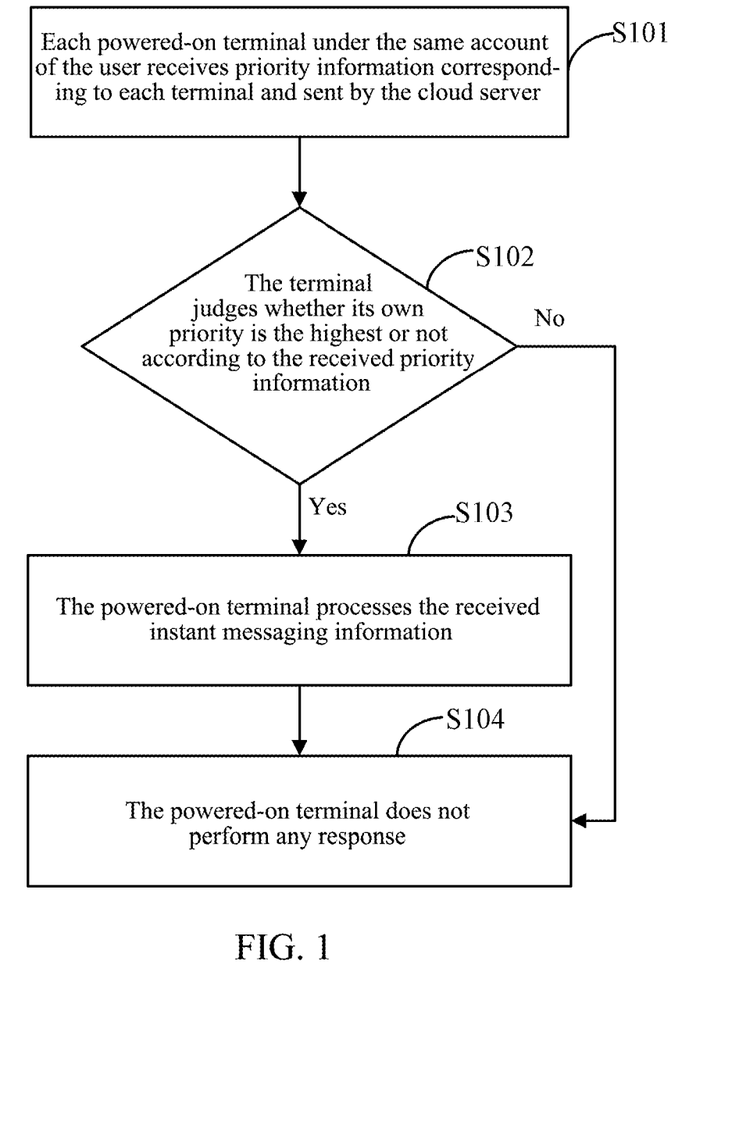
FIG. 1 is a flow chart of a method for processing instant messaging information under the same account in accordance with an embodiment of the present document.

The embodiment of the present document provides a method for processing instant messaging information, and as shown in FIG. 1, the method comprises the following steps.

In step S101, each powered-on terminal under the same account of the user receives respectively priority information corresponding to each terminal and sent by the cloud server.

In step S102, when a powered-on terminal receives the instant messaging information, the terminal judges whether its own priority is the highest or not according to the received priority information, and if yes, it is to proceed to step S103; if no, it is to proceed to step S104.

In step S103, the terminal processes the received instant messaging information.

In step S104, the terminal does not perform any response to the received instant messaging information.

Figure 2:
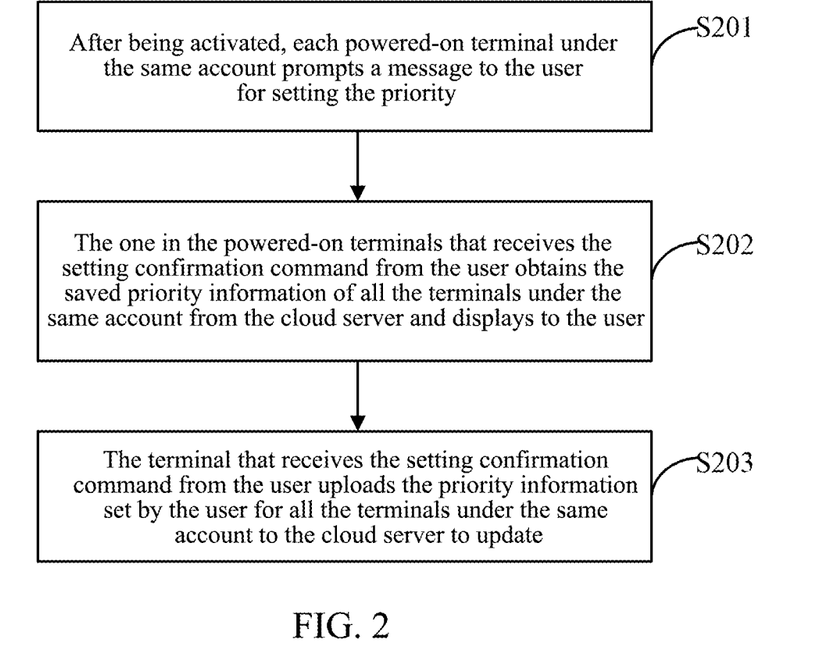
FIG. 2 is a flow chart of a cloud server obtaining priority information of all terminals in accordance with in an embodiment of the present document.

In step S101, the priority information corresponding to each terminal and sent by the cloud server is preset by the user. In addition, before the user presets the priority information, the cloud server stores not only the priority information corresponding to the plurality of powered-on terminals, but also the priority information corresponding to a plurality of other powered-off terminals under the same account of the user. As shown in FIG. 2, the priority information of all the terminals under the same account stored in the cloud server can be updated through the following steps.

In step S201, after being activated, each powered-on terminal under the same account prompts a message to the user for setting the priority.

In step S202, the one in the powered-on terminals under the same account that receives the setting confirmation command from the user obtains the saved priority information of all the terminals under the same account from the cloud server and displays it to the user.

In step S203, the terminal that receives the setting confirmation command from the user uploads the priority information set by the user for all the terminals under the same account to the cloud server to update.

Alternatively, in step S201, for each powered-on terminal, its own Near Field Communication (NFC) non-contact sensing device can be used to induce with the NFC non-contact sensing devices of other terminals in order to activate the priority setting application program of the terminal, thereby completing the abovementioned priority updating process.

In step S202, in all the powered-on terminals, if there is one terminal receiving the user's setting confirmation command, this terminal actively initiates a request to the cloud server to obtain priority information of all the terminals under the same account, herein the priority information can be represented by the identification bit of the terminal, for example, the identification bit of high priority is "1", and the identification bit of low-priority is "0", and of course, it is not limited to this representation, and others are not listed here; after receiving this request, the cloud server returns the locally saved priority information of all the terminals to the terminal, and the terminal displays the priority information to the user and displays the names of the terminals under the same account to the user in the form of a list, so that the user can set the priority of each terminal.

In the embodiment of the present document, for the priority information of all the terminals saved by the cloud server, after a plurality of powered-on terminals are activated for the first time, the saved priority information of all the terminals is the initial priority information of all the terminals in this case, that is, the priorities of all the terminals are the same. Later, after the plurality of powered-on terminals are activated again, in this case, the stored priority information of all the terminals is the information obtained by the cloud server updating the priority information of all the terminals uploaded by the terminal which previously receives the setting confirmation command from the user.

In the embodiment of the present document, when the terminal has the highest priority and needs to power off at the user's demand, the terminal needs to upload its own power-off state information to the cloud server, therefore, the cloud server can send a prompt message to other powered-on terminals to request the user to reset priorities of all the terminals after receiving the power-off state information from the terminal, then for the other powered-on terminals, they need to display the priority information of all the terminals for the user to select after receiving this prompt message, and subsequently the terminal which receives the command from the user for confirming the prompt message obtains the saved priority information of all the terminals from the cloud server and displays it to the user, after receiving the priority information of all the terminals reset by the user, this terminal uploads the set priority information of all the terminal to the cloud server.

In addition, besides that the user can activate each powered-on terminal through the NFC non-contact sensing device in the embodiment of the present document, the user can also manually select a software program to activate the powered-on terminal, to facilitate the user to set the priorities of the terminals anytime and anywhere.

The embodiment of the present document further provides a terminal as well as a system for processing instant messaging information, since the principle of the device and system solving the problem is similar to that of the abovementioned method for processing instant messaging information, the implementation of the device and the system can refer to the implementation of the aforementioned method, and the duplications are not described.

Figure 3:
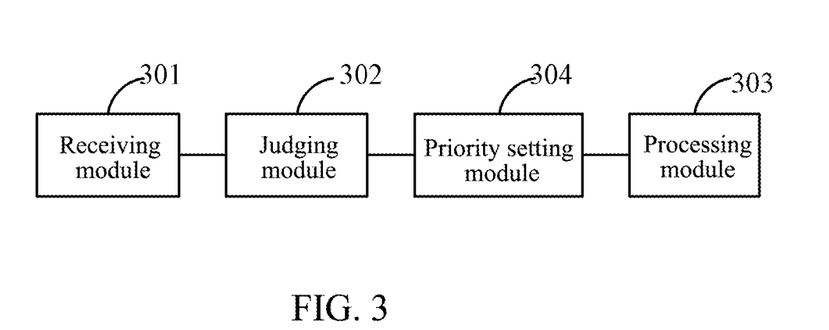
FIG. 3 is a block diagram of a terminal in accordance with an embodiment of the present document.

A terminal provided in the embodiment of the present document, as shown in FIG. 3, comprises:

receiving module 301, which is configured to: receive priority information sent by the cloud server;

judging module 302, which is configured to: when the terminal is powered on and receives instant messaging information, judge whether its own priority is the highest or not according to the priority information received by the receiving module 301; and processing module 303, which is configured to: when the judging module 302 determines that its own priority is the highest, do not process the received instant messaging information; when the judging module 302 determines that its own priority is not the highest, do not perform any response to the received instant messaging information.

As shown in FIG. 3, the abovementioned terminal further comprises:

priority setting module 304, which is configured to: after the terminal is powered on and activated, prompt a message to the user for setting the priority; after the terminal receives the user's setting confirmation command, obtain the saved priority information of all the terminals under the same account from the cloud server and display it to the user; and after the terminal receives the user's setting confirmation command, upload the priority information set respectively by the user for all the terminals under the same account to the cloud server to update.

The judging module 302 is further configured to: when the terminal need to power off, judge whether its own priority is the highest or not according to the priority information received by the receiving module 301;

the priority setting module 304 is further configured to: when the judging module 302 determines that the priority of the terminal is the highest, upload the terminal's power-off state information to the cloud server; receive the prompt message for resetting the priorities of all the terminals sent by the cloud server after receiving and the power-off state information and display it to the user.

Figure 4:
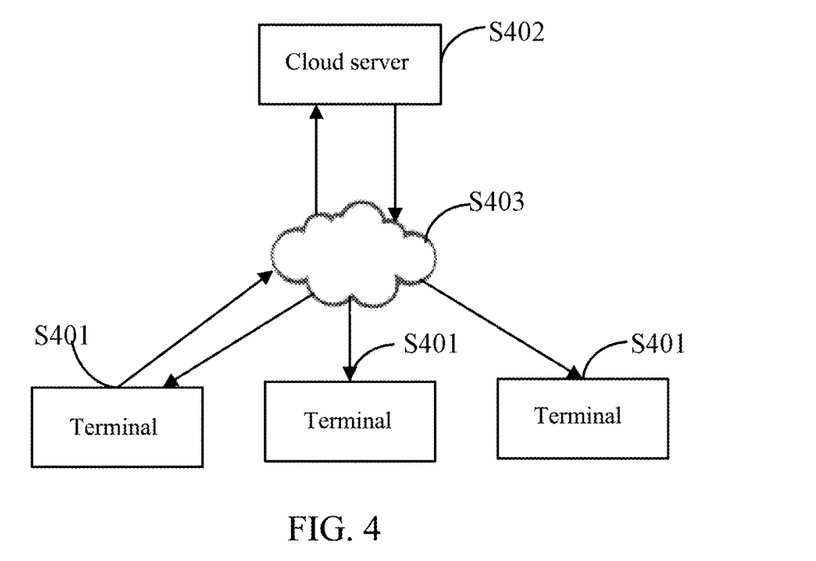
FIG. 4 is a block diagram of a system for processing instant messaging information under the same account in accordance with an embodiment of the present document.

A system for processing instant messaging information provided in the embodiment of the present document, as shown in FIG. 4, comprises a plurality of terminals 401 and cloud server 402;

each terminal 401 is configured to: communicate with the cloud server 402 through the wireless network 403, receive the priority information corresponding to each terminal sent by the cloud server 402 when itself is powered on; and judge whether its own priority is the highest or not according to the received priority information when receiving instant messaging information, and process the received instant messaging information when determining that its own priority is the highest;

the cloud server 402 is configured to: receive the priority information of all the terminal uploaded by the terminal (such as the first terminal shown in FIG. 4) which is powered on and receives the user's setting confirmation command; and update the locally stored priority information of all the terminals according to the received priority information, and send the updated priority information of all the terminals to all the powered-on terminals (such as the three powered-on terminals shown in the figure).

Figure 5:
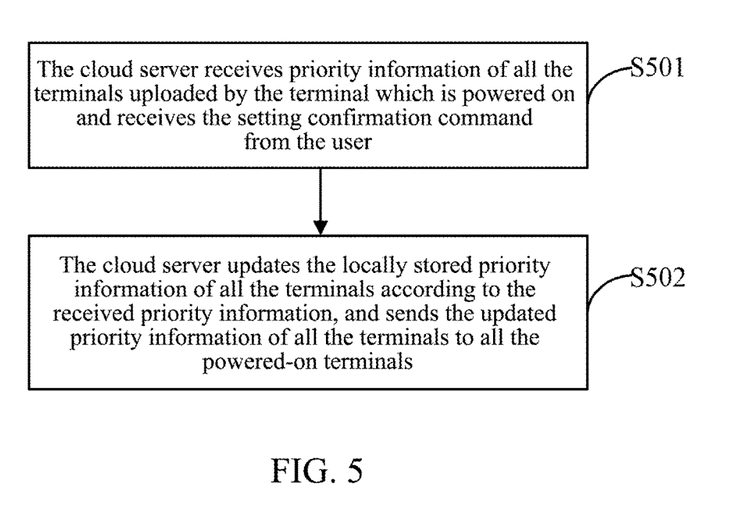
FIG. 5 is a flow chart of a method for setting priorities of terminals under the same account in accordance with an embodiment of the present document.

The embodiment of the present document further provides a method for setting terminal priority, and as shown in FIG. 5, the method comprises the following steps.

In step S501, the cloud server receives priority information of all the terminals uploaded by the terminal which is powered on and receives the setting confirmation command from the user.

In step S502, the cloud server updates the locally stored priority information of all the terminals according to the received priority information, and sends the updated priority information of all the terminals to all the powered-on terminals.

In the abovementioned method, if the cloud server receives the power-off state information uploaded by the terminal with the highest priority, it is needed to send a prompt message for resetting the priorities of all the terminals to other powered-on terminals; the terminal which receives the command from the user for confirming the prompt message obtains the stored priority information of all the terminals from the cloud server and displays it to the user, and the terminal uploads the set priority information of all the terminals to the cloud server after receiving the priority information of all the terminals reset by the user.

The embodiment of the present document further provides a cloud server, since the principle of the device and system solving the problem is similar to that of the abovementioned method for processing instant messaging information, the implementation of the device and the system can refer to the implementation of the aforementioned method, and the duplications are not described.

Figure 6:
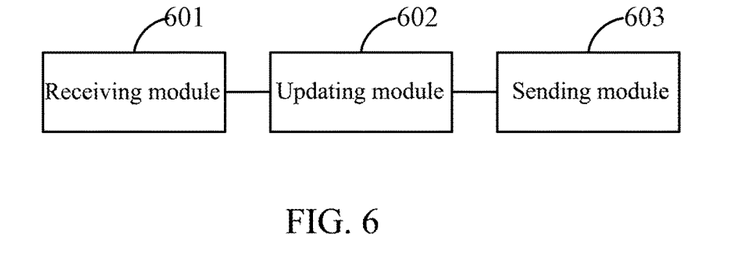
FIG. 6 is a block diagram of a cloud server in accordance with an embodiment of the present document.

A cloud server provided in the embodiment of the present document, as shown in FIG. 6, comprises:

receiving module 601, which is configured to: receive the priority information of all the terminals uploaded by the terminal which is powered on and receives the setting confirmation command from the user;

updating module 602, which is configured to: update the locally stored priority information of all the terminals according to the priority information received by the receiving module 601; and sending module 603, which is configured to: send the priority information of all the terminals updated by the updating module 602 to all the powered-on terminals.

The sending module 603 is further configured to: when receiving the power-off state information uploaded by the terminal with the highest priority, send a prompt message for resetting the priorities of all the terminals to other powered-on terminals.

Through the method, device and system for processing instant messaging information and setting the terminal priority provided in the embodiment of the present document, in the method for processing the instant messaging information under the same account, each powered-on terminal under the same account of the user respectively receives the priority information corresponding to each terminal and sent by the cloud server; when the powered-on terminal receives the instant messaging information, it judges whether itself has the highest priority or not according to the received priority information, and processes the instant messaging information in the case of determining that its own priority is the highest. In the embodiment of the present document, when a plurality of terminals under the same account of the user receive the instant messaging information at the same time, the terminal with the highest priority set by the user processes the instant messaging information, while the other terminals do not perform any response, so that the user can set according to the user's own needs. For example, when the user is away, the user can set the mobile phone with the highest priority according to the abovementioned method, and the mobile phone processes the received instant messaging information; when the user is back home, the user can set the tablet (iPad) with the highest priority according the abovementioned method, and the ipad processes the received instant messaging information. Obviously, the abovementioned processing mode can be used to make that the privacy of the user's personal information is relatively good and the security is relatively high, and the problem of processing confusion can be avoided.

Obviously, those skilled in the art can understand that each abovementioned module or step of the present document may be implemented with general purpose computing devices, they can be concentrated on a single computing device or distributed in a network composed of a plurality of computing devices, alternatively, they can be implemented using program codes executable by computing devices, therefore, they can be stored in the storage devices and executed by the computing devices, in some cases, the steps shown or described herein may be executed in a different order, or they are made into respective integrated circuit modules, or some of the modules or steps are produced into a single integrated circuit module to implement. Therefore, the embodiment of the present document is not limited to any specific combination of hardware and software.

Obviously, a person skilled in the art can make various modifications and variations on the embodiments of the present document without departing from the spirit and scope of the present document. Thus, if such modifications and variations of the present document belong to the claims of the present document the equivalents thereof, the present document is also intended to encompass such modifications and variations.

INDUSTRIAL APPLICABILITY

With the method, device and system of the embodiment of the present document, the privacy of the user's personal information can be relatively good and the security can be relatively high, and the problem of processing confusion can be avoided.

What is claimed is:

1. A method for processing instant messaging information comprising:

each powered-on terminal among a plurality of terminals under a same account of a user respectively, receiving a priority information corresponding to each powered-on terminal from a cloud server, wherein the priority information corresponding to the each powered-on terminal is preset by the user; and when a powered-on terminal receives an instant messaging information, the powered-on terminal determines whether its own priority is the highest according to the received priority information, and if the determined priority is the highest, processing the received instant messaging information; if the determined priority is not the highest, not performing any response to the received instant messaging information;

wherein the method further comprises:

when the powered-on terminal with the highest priority needs to power off, uploading its own power-off state information to the cloud server; and each of the other powered-on terminals among the plurality of terminals under the same account of the user receiving a prompt message sent by the cloud server to reset priorities for all the powered-on terminals, after the cloud server receives the power-off state information, and displaying the prompt message to the user;

one of the other powered-on terminals that receives the user confirmation to reset the priorities, obtaining saved priority information of the plurality of terminals from the cloud server and displaying the saved priority information to the user;

the said other powered-on terminal receiving the priority information reset by the user for the plurality of terminals and uploading the reset priority information to the cloud server to update.

2. The method of claim 1, wherein presetting the priority information corresponding to each powered-on terminal comprising:
  activating each powered-on terminal under the same account;
  after being activated, each powered-on terminal under the same account prompting a message to the user for setting the priority;
  a powered-on terminal which receives a setting confirmation command from the user in the plurality of terminals under the same account obtaining saved priority information of the plurality of terminals under the same account from the cloud server and displaying the saved priority information to the user; and
  the said powered-on terminal which receives the setting confirmation command from the user uploading the priority information of the plurality of terminals respectively set by the user under the same account to the cloud server to update.

3. The method of claim 2, wherein, the step of activating each powered-on terminal under the same account comprises:
  each powered-on terminal using its own near field communication (NFC) non-contact sensing device to induce with NFC non-contact sensing devices of other terminals to be activated.

4. A method for setting and updating terminal priority at a cloud server, comprising:
  receiving a power-off state information uploaded by a powered-on terminal with a highest priority among a plurality of terminals under a same account of a user at the cloud server;
  sending a prompt message to the each of the other powered-on terminals among the plurality of terminals under the same account of the user to reset priorities for the each of the plurality of terminals, after the cloud server receives the power-off state information, and displaying the prompt message to the user;
  receiving the user confirmation to reset the priorities from one of the other powered-on terminals;
  sending saved priority information of the plurality of the terminals to the said other powered-on terminal that receives the user confirmation to reset the priorities, and displaying the saved priority information to the user at the said other powered-on terminal for resetting;
  receiving uploaded priority information from the said other powered-on terminal, the priority information reset by the user for the plurality of terminals;
  the cloud server updating locally stored priority information of the plurality of terminals according to the received priority information reset by the user for the plurality of terminals, and sending the updated priority information of the plurality of terminals to each of the powered-on terminals.

5. A terminal among a plurality of terminals under a same account of a user, comprising:
  a non-transitory computer readable storage medium;
  a processor coupled to the non-transitory computer readable storage medium, executing:
  a receiving module to receive priority information sent by a cloud server, wherein the priority information is preset by the user;
  a judging module to determine, when the terminal is powered on and receives an instant messaging information, whether its own priority is highest according to the priority information received by the receiving module; and
  a processing module, when the judging module determines that the terminal priority is the highest, to process the received instant messaging information; when the judging module determines that the terminal priority is not the highest, not to perform any response to the received instant messaging information;
  wherein the judging module, when the terminal needs to power off, determines whether the terminal priority is the highest according to the priority information received by the receiving module;
  wherein a priority setting module, when the judging module determines that the terminal priority is the highest, uploads the power-off state information of the terminal to the cloud-server; and receives a prompt message sent by the cloud server for resetting priorities of the plurality of terminals after receiving the power-off state information and displays the prompt message to the user;
  wherein the priority setting module receives the user confirmation to reset the priorities for the plurality of terminals, and obtains saved priority information of the plurality of terminals from the cloud server and displays the saved priority information to the user, and receives the priority information reset by the user for the plurality of terminals and uploads the reset priority information to the cloud server to update.

6. The terminal of claim 5, wherein presetting the priority information corresponding to the terminal comprising:
  the priority setting module, after the terminal is powered on and activated, prompts a message to the user for setting the priority; after the terminal receives a setting confirmation command by the user, and obtains saved priority information of the plurality of terminals under the same account of the user from the cloud server and displays the saved priority information to the user, and receives the priority information set by the user for the plurality of terminals and uploads the set priority information to the cloud server to update.

7. A cloud server for storing and updating terminal priority, comprising:
  a non-transitory computer readable storage medium;
  a processor coupled to the non-transitory computer readable storage medium, executing:
  a sending module, after receiving power-off state information uploaded by a powered-on terminal with a highest priority, to send a prompt message to the each of the other powered-on terminals among a plurality of terminals under a same account of a user to reset priorities for each of the plurality of terminals; and to send saved priority information of the plurality of the terminals to the other powered-on terminal that receives the user confirmation to reset the priorities;
  a receiving module to receive uploaded priority information from the said other powered-on terminal, the priority information reset by the user for the plurality of terminals;
  an updating module to update locally stored priority information of the plurality of terminals according to the received priority information reset by the user for the plurality of terminals, and sending the updated priority information of the plurality of terminals to each of the powered-on terminals.

8. The method of claim 2, wherein each of the powered-on terminals comprises a near field communication (NFC) non-contact sensing device, which is used to induce with another NFC non-contact sensing device of another of the plurality of terminals in order to activate priority setting application program of the another terminal.

9. The method of claim 2, wherein the priority information is represented by identification bit of a powered-on terminal.

10. The method of claim 2, wherein each of the powered-on terminals is activated by a software program.

11. The terminal of claim 6, wherein the terminal comprises a near field communication (NFC) non-contact sensing device, which is used to induce with another NFC non-contact sensing device of another of the plurality of terminals in order to activate priority setting application program of the another terminal.

12. The terminal of claim 6, wherein the priority information is represented by identification bit of the terminal.

13. The terminal of claim 6, wherein the terminal is activated by a software program.

\* \* \* \* \*